3,220,878
WEAR- AND STAIN-RESISTANT COATED
ARTICLES
Arthur N. Pines, Snyder, N.Y., assignor to Union Carbide
Corporation, a corporation of New York
No Drawing. Filed Oct. 8, 1962, Ser. No. 229,222
20 Claims. (Cl. 117—123)

This application is a continuation-in-part of copending application Serial No. 745,057, filed June 27, 1958, now abandoned.

This invention relates to novel coated articles of manufacture and to processes for providing gloss to ceramic and cementitious articles and rendering them resistant to abrasion and staining. More particularly, this invention is directed to ceramic and cementitious articles having thereon a coating of a resinous material comprising the reaction product of an epoxy compound and an amino-organosilicon compound. Ceramic articles as contemplated by this invention are articles formed by the firing or baking of clays or clay mixtures as is commonly known in the art and includes such articles as glazed or unglazed porcelains, chinas, pottery, earthenware, porcelain enamels, bricks, tiles and the like. Cementitious articles as contemplated by this invention are articles comprising a non-vitreous inorganic cement in a hardened condition and includes such articles as marble, limestone, sandstone, mortar, concrete and plaster of Paris articles, sea shells, terrazzo, asbestos shingles and the like.

Many ceramic and cementitious articles, particularly, the unglazed ceramic and the porous cementitious articles, have poor resistance to staining even under the mildest of conditions. Those ceramic and cementitious articles that do resist staining to some extent, become more susceptible to staining as the surface of the article becomes worn and abraded. Furthermore, while certain ceramic and cementitious articles may show some resistance to staining by certain reagents, other reagents easily attack and stain the article. While glossy surfaces can be provided on ceramic articles by glazing and on cementitious articles by polishing, such surfaces are non-permanent and become dull and porous during normal usage. Chemical and mechanical erosion cause glazed ceramic articles and polished cementitious articles to lose their gloss and develop porous surfaces which are susceptible to staining. Heretofore, the glossy surfaces such as that originally possessed by such articles could be restored only by re-glazing the abraded surface (as in ceramic articles) or re-polishing the abraded surface (as in cementitious articles). Both of these procedures are extremely expensive and thus undesirable. Attempts to coat ceramic and cementitious articles with heretofore known materials including organic and inorganic resins have met with no complete success. Coatings heretofore provided to ceramic and cementitious articles have failed in one or more essential property. In order to be successful as a coating for ceramic or cementitious articles, a material must tenaciously adhere to the surface it is covering under a wide spectrum of conditions, as temperature, abrasion, action of chemical reagents, mechanical action and the like. It must also resist mechanical and chemical wear and water and chemical permeation, and preferably be transparent in addition to being capable of providing a gloss to the article being coated.

It is therefore an object of this invention to provide ceramic and cementitious articles with smooth, tough, stain- and wear-resistant coatings which impart a transparent gloss to said articles.

It is another object of this invention to provide a process for coating ceramic and cementitious articles at ambient temperatures to form well bonded, mechanically strong coatings which are stable and protective to the coated article under a wide variety of severely degradative conditions and which can be, as desired, applied in extremely thin thickness (as low as about 0.05 mil and even lower) and still remain stable and protective, or in thicknesses up to several mils or higher.

A further object of this invention is to provide a coated article which will resist any material degradation of the coating or coated surface thereof by even severe mechanical and chemical attack.

My coated ceramic or cementitious articles are resistant to attack by chemicals in the form of vapor, liquid or solid and which are acidic, basic or neutral in nature. The films or coatings on my coated articles are normally colorless and transparent (although they readily pigmented or dyed to provide coloring or opacity) and do not adversely affect the usual appearance of ceramic and cementitious articles carrying said film or coating. There is no oily residual film imparted to the surface of the article and when the coated ceramic or cementitious article exhibits its original appearance (except for gloss imparted by the coating and the manifestations of resistance to deterioration) as though it carried no coating at all. Hence, the appearance of ceramic or cementitious articles need not be altered by the presence thereon of the films or coatings produced by my invention and the original decorative appearance of such articles are preserved and the articles themselves are protected from deterioration.

The process of this invention for providing glass to ceramic and cementitious articles and rendering them resistant to abrasion and straining comprises the application of a composition containing a mixture or combination of an amino-organosilicon compound and an epoxy compound to a ceramic or cementitious article. The process is advantageously conducted at ambient temperatures and need not be conducted at elevated temperatures, although such elevated temperatures and even lower than ambient temperatures can be used, if desired. The process is capable of being carried out without the necessity of positively imposing thereon any further physical or chemical drying or curing inducements, such as, heat, pressure, catalyst and the like, although such inducements can be used if desired. Application of the composition can be accomplished through the employment of any of the procedures generally known in the coating industry using existing equipment. There are no complications in obtaining films of uniform thickness and films of any desired thickness are readily obtained in accordance with my invention without materially sacrificing the superior properties of my coatings. These films adhere tenaciously to the ceramic and cementitious articles on which they are formed and show no tendency to peel, powder, flake or otherwise become detached from the article even if small pinholes exist in the film. My process is extremely versatile and is employable under a wide variety of different circumstances. Most importantly, the process is capable of practice under ordinary atmospheric conditions and no special precautions, such as the exclusion of air, moisture and the like or the use of inert gas blankets, need be employed.

The compositions employed in my process are comprised of one or more amino-organosilicon compound and one or more epoxy compound. In a preferred embodiment the compositions comprise partially reacted mixtures or adducts of amino-organosilicon compounds and epoxy compounds. As a second preferred embodiment the compositions also contain a volatile organic diluent in addition to the amino-organosilicon and epoxy compounds or adducts thereof. The compositions also contain, in another preferred embodiment, hydrocarbyl-silicon compounds which contain no silicon bonded amino-organo groups but are mainly composed of silicon, silicon bonded hydrocarbon and hydrocarbyloxy groups and oxygen linkages in addition to the amino-organosilicon and epoxy compounds or adducts. Varying amounts of additives such as anti-blush agents, pigments, resins, dyes, fillers, anti-foam agents, and other agents for developing special properties, such as improved gloss, improved mar resistance, and the like in coatings made therefrom, can be added to the compositions, as desired.

Thus, the compositions essentially comprise an amino-organosilicon compound which is an amino-organosilane having at least one amino-organic group containing at least one amino nitrogen atom which is connected to the silicon of the silane through not less than 3 carbon atoms and from 1 to 2 amino hydrogen atoms bonded to the nitrogen atom or an amino-organosiloxane polymer having silicon atoms interconnected by oxysilicon bonds, and at least one amino-organic group containing at least one amino nitrogen atom which is connected to the silicon of the siloxane through not less than 3 carbon atoms and from 1 to 2 amino hydrogen atoms bonded to the nitrogen atom; and an epoxy compound.

Amino-organosilicon compounds which are employed in the compositions are compounds containing one silicon atom or more than one silicon atom interconnected with each other by silicon to oxygen to silicon linkages and one or more amino groups containing at least one nitrogen bonded hydrogen, —NH—, connected to silicon through at least 3 carbon atoms of a hydrocarbon group. These compounds include amino-organosilanes and -siloxanes and contain at least one amino-organo group bonded to silicon through silicon to carbon bond. The amino-organo group contains at least one amino-nitrogen atom interconnected to each of 1 or 2 silicon atoms through not less than 3 carbon atoms and contains 1 to 2 amino hydrogen atoms attached to the amino-nitrogen atom. Each remaining unfilled valence, if any, is filled by a monovalent organic group, e.g., hydrocarbyl or a heterocyclic group, preferably containing a 5 or 6 membered heterocyclic ring or a 9 to 14 membered fused heterocyclic ring composed of no other elements than carbon, sulfur, oxygen and nitrogen and no other substituents on the ring than hydrogen and hydrocarbyl, or an aminoalkylene or a poly(aminoalkylene) group. Each silicon atom of the amino-organosilicon compound is connected to one to three oxygen atoms which in turn are connected to no other elements than carbon of an alkyl group, hydrogen and silicon. Each remaining unfilled valence of silicon is satisfied by no other group than hydrocarbyl, halogenated hydrocarbyl, alkoxy and hydroxy groups. These compounds can be illustrated by the formula

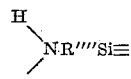

wherein R'''' is a divalent hydrocarbon group of at least 3 carbon atoms, the nitrogen atom is interconnected through at least 3 carbon atoms to the silicon atom and the unfilled valence of the nitrogen is satisfied by hydrogen, a monovalent organic group or—R''''Si≡ through carbon to nitrogen linkage. All silicon atoms are bonded to 1 to 3 oxygen atoms which in turn are bonded to no other elements than hydrogen, carbon of an alkyl group and silicon and each remaining unfilled valence of all silicon atoms is satisfied by hydrocarbyl, halogenated hydrocarbyl, alkoxy, hydroxy or —NHR''''— through carbon to silicon linkage, R'''' and the unfilled valence of N being as defined above. Amino-organosilicon compounds which are particularly suitable for the compositions employed in my process are as defined above wherein R'''' is an alkylene group.

Aminoalkylsilicon compounds which are exceptionally useful in the compositions are composed of one silicon atom bonded to one to three oxygen atoms or several silicon atoms each bonded to one to three oxygen atoms and interconnected through oxysilicon bonds. There is at least one aminoalkyl group,

R'' and $n$ being particularly defined hereinafter, attached to silicon through silicon to carbon bondage, the amino moiety of the aminoalkyl group being attached to an alkyl carbon atom, i.e., a carbon atom of the alkyl moiety, which is at least one alkyl carbon atom removed from the alkyl carbon atom attached to silicon. The silicon bonded oxygen atom is bonded to another silicon atom or to a member from the class of hydrogen and an alkyl group. Each remaining unfilled valence of silicon is satisfied by a a hydrocarbyl group. By the term "hydrocarbyl" as used herein, is meant a monovalent group composed of carbon and hydrogen, such as, alkyl, aryl, alkenyl and the like. Illustratively, hydrocarbyl is methyl, ethyl, phenyl, vinyl, or the like. These aminoalkylsilicon compounds are represented by the formula:

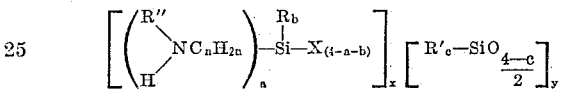

In this formula:

(1) R' and R'' are hydrogen or hydrocarbyl and need not be the same throughout the same molecule;
(2) R is hydrocarbyl, halogenated hydrocarbyl, hydroxy or hydrocarbyloxy, preferably alkoxy or aryloxy, and need not be the same throughout the same molecule;
(3) X is hydroxy, hydrocarbyloxy, preferably alkoxy or aryloxy, or $O_{1/2}$;
(4) $n$ is an integer from 3 to 9;
(5) $a$ is an integer from 1 to 3;
(6) $b$ is an integer from 0 to 2;
(7) $c$ is an integer from 0 to 3;
(8) $a+b$ is an integer from 1 to 3;
(9) $x$ is an integer equal to one when X is hydroxy or hydrocarbyloxy and a mole fraction greater than 0, but not greater than 1 when X is $O_{1/2}$;
(10) $y$ is equal to zero when X is hydroxy or hydrocarbyloxy and a mole fraction from 0 to less than 1 when X is $O_{1/2}$;
(11) $x+y$ is equal to 1; and
(12) the amino group, —NHR'' is attached to a carbon atom which is at least two carbon atoms removed from silicon.

Thus, the formula illustrates aminoalkylsilanes, aminoalkylpolysiloxanes composed of only aminoalkylsiloxane units and aminoalkysiloxane-hydrocarbylsiloxane copolymers composed of both aminoalkylsiloxane units and hydrocarbylsiloxane units, aminoalkylalkoxysiloxane units alone or with hydrocarbylalkoxysiloxane units and/or aminoalkylsiloxane units and/or hydrocarbylsiloxane units, all of which being particularly useful in the compositions. These siloxanes are also hereinafter referred to as the aminoalkylsilicones.

Typifying the aminoalkylsilanes which are used in my invention are those compounds represented by the structural formula:

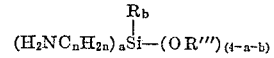

wherein R''' is hydrogen or hydrocarbyl, preferably hydrogen or alkyl, such as methyl, ethyl, propyl, and butyl, and the like, R is hydrocarbyl, $n$ is an integer from 3 to 9 and preferably from 3 to 4, $a$ is an interger from 1 to 3 and preferably 1 to 2, $b$ is an integer from 0 to 2 and preferably from 0 to 1, the sum of $a+b$ is not greater than 3, and —NH$_2$ is attached to carbon which is at least two carbons removed from silicon.

Typical of the aminoalkylpolysiloxanes which are used in the compositions are those polysiloxanes having the formula:

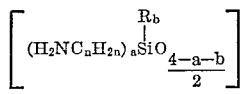

wherein R, $n$, $a$, $b$ and the position of the —$NH_2$ group are as described above. Such polysiloxanes are prepared by the hydrolysis and condensation of those aminoalkylsilanes described above or by the cohydrolysis and cocondensation of mixtures of such anminoalkylalkoxysilanes and include aminoalkylpolysiloxanes of the trifunctional variety (i.e., where $a=1$ and $b=0$), aminoalkylalkylpolysiloxanes and aminoalkylarylpolysiloxanes of the difunctional variety which include cyclic or linear polysiloxanes (i.e., where $a=2$ or $a=1$ and $b=1$), and aminoalkyldialkyldisiloxanes, aminoalkyldiaryldisiloxanes and aminoalkylalkylaryldisiloxanes of the monofunctional variety (i.e., where $a=3$, $a=2$ and $b=1$ or $a=1$ and $b=2$) as well as the mixture of compounds produced by the cohydrolysis of difunctional trifunctional and monofunctional aminoalkylsilanes.

Typical copolymeric aminoalkylpolysiloxanes which can be employed in my process can be depicted as having the formula:

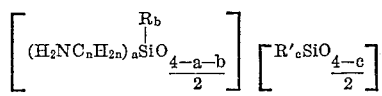

wherein R, R', $n$, $a$, $b$, $c$ and the position of —$NH_2$ as are previously defined. The copolymeric materials described herein include copolymers having two or more different units. The copolymers suitable for use in my compositions can contain various combinations of siloxane units such as trifunctional aminoalkylsiloxane units (where $a=1$ and $b=0$) with trifunctional hydrocarbyl, e.g., alkyl-, aryl-, olefinic-, or mixed hydrocarbyl units (where $c=1$) or with difunctional hydrocarbyl or mixed hydrocarbyl siloxane units (where $c=2$). Copolymers containing other combinations of siloxane units are useful, e.g., difunctional aminoalkylsiloxane units (where $a=1$ and $b=1$ or $a=2$ and $c=0$) with trifunctional hydrocarbyl or mixed hydrocarbyl siloxane units (where $c=1$) or with difunctional hydrocarbyl siloxane units (where $c=2$).

Those polymers which contain trifunctional aminoalkylsiloxane units and other hydrocarbyl siloxane units are advantageously prepared by the cohydrolysis and cocondensation of the corresponding alkoxysilane starting materials. Such copolymers can contain silicon-bonded alkoxy and/or hydroxyl groups or they can comprise essentially completely condensed materials. The linear and cyclic copolymeric siloxanes are prepared by the method just described or by the separate hydrolysis and condensation of an aminoalkylalkyldialkoxysilane or aminoalkylaryldialkoxysilane and the dihydrocarbyldialkoxysilanes, such as, dialkyldialkoxysilane, diolefinicdialkoxysilane, alkylaryldialkoxysilane, mono - alkyl - monoolefinic-dialkoxysilane, mono-aryl-mono-olefinic-dialkoxysilane, or diaryldialkoxysilane to form, respectively cyclic aminoalkylsiloxanes and cyclic dihydrocarbylsiloxanes, such as, alkylarylsiloxanes, dialkylsiloxanes, diolefinicsiloxanes, mono-alkyl-mono-olefinicsiloxanes, monoaryl-mono-olefinicsiloxanes or diarylsiloxanes, and subsequently equilibrating mixtures of such cyclic siloxanes to linear copolymers.

The polymeric and copolymeric aminoalkylsiloxanes used in the compositions can be varied as to molecular weight, type and functionality of silanic-boned hydrocarbyl groups, ratio of silanic-bonded hydrocarbyl groups to silicon atoms and ratio of silanic-bonded aminoalkyl groups to silanic-bonded hydrocarbyl groups in order to develop special properties in films laid down from compositions containing them.

Illustrations of amino-organosilicon compounds are gamma - aminopropyltriethoxysilane, gamma - aminopropylmethyldiethoxysilane, delta - aminobutyltriethoxysilane, delta-aminobutylphenyldiethoxysilane and other aminoalkylalkoxysilanes and polysiloxanes from these silanes or from mixtures of such silanes alone or with hydrolyzable hydrocarbyl-substituted silanes disclosed as compositions of matter in copending United States applications, Serial Nos. 483,421; 615,466; and 615,480 filed January 21, 1955; October 12, 1956, and October 12, 1956, respectively. Further illustrations are

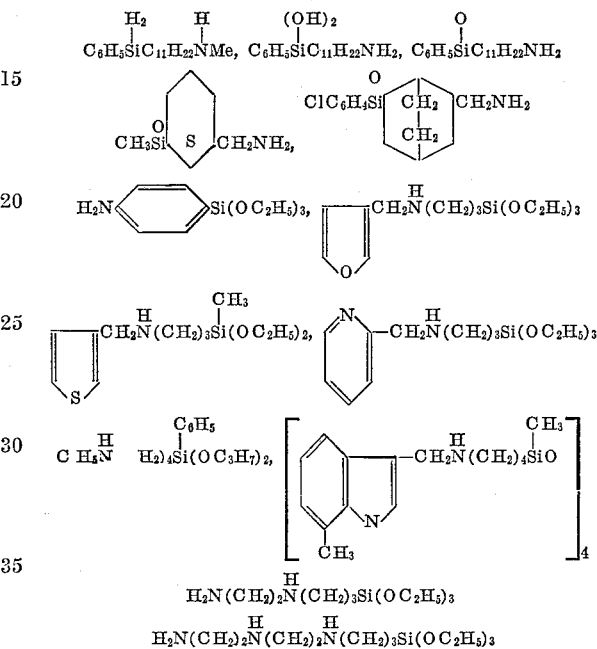

and the like.

Any amino-organosilicon compounds of the types described above whether silanes or siloxanes, cyclics, oils, gums, resins or otherwise need only be soluble in any organic solvent in order to be useful in making the preferred compositions. Mixtures of different amino-organosilicon compounds or mixtures of amino-organosilicon compounds and other organic solvent soluble hydrocarbylsilicon compounds, such as, the hydrocarbylsilanes and hydrocarbylsiloxanes, e.g., dimethyldialkoxysilane, phenyltrialkoxysilane, triethylalkoxysilane, the dimethyl oils, the phenylmethyl oils, the methylsiloxane resins and the like can also be used. The polysiloxanes, including the amino-organosiloxanes and the hydrocarbylsiloxanes, which contain amounts of residual hydrocarbyloxy and hydroxy groups connected to silicon, as made by partial hydrolysis and essentially complete condensation, essentially complete hydrolysis and partial condensation or partial hydrolysis and partial condensation of the hydrolyzable silane precursor, are included in the polysiloxanes which can be employed in the compositions described herein. An important aspect of this invention is the use of mixtures of amino-organosilanes and hydrocarbylsilanes containing one or more hydrocarbyloxy, preferably alkoxy groups, to the molecule as reactive components in the compositions in addition to the aminoalkylsilicon components.

The hydrocarbylsilicon compounds, including the hydrocarbylsilanes and the hydrocarbysiloxanes are well known to those skilled in the art. These compounds can be represented by the formula:

$$R'_c Si—X_{4-c}$$

wherein R', X and $c$ have been previously defined. Preferred amongst these compounds are those containing one or more silicon bonded alkoxy groups. The preparation of these compounds are also well known to those skilled in the art and reference is herein made to the numerous United States Patents and scientific textbooks and journal articles relating to silicon compounds and their preparation.

Thus, in another important embodiment the compositions comprise amino-organosilicon compounds, hydrocarbylsilicon compounds and epoxy compounds. All of these compounds are described herein. Equally important compositions contain, in addition to the above-listed reactive components, a volatile organic diluent as previously described.

Epoxy compounds which are used in the compositions employed in my process are organic compounds containing at least one pair of vicinal carbon atoms to which oxirane oxygen is attached

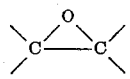

These compounds are for the most part composed of carbon, hydrogen, and oxygen but can also contain such other atoms as nitrogen, sulfur, halogen, phosphorus, silicon, boron and the like. Typical epoxy compounds are represented by the formula:

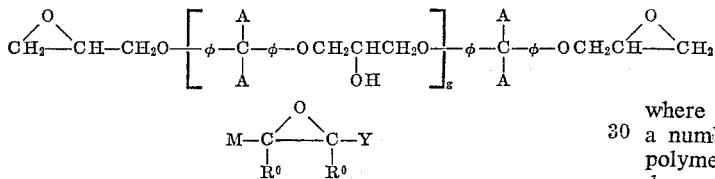

wherein R° represents alkyl or hydrogen and need not be the same throughout the same molecule; each of the groups M and Y represents hydrogen or a monovalent group composed of a single carbon atom or a group of carbon atoms interconnected by single or multiple bonds and to which such groups as hydrogen, alkyl, hydroxyl, alkoxy, cyclic hydrocarbon groups and the like or combinations thereof can be attached. As groups of carbon atoms, M and Y can contain open chain, e.g., aliphatic, or cyclic, e.g., cycloaliphatic or aromatic and heterocyclic groups or combinations thereof. M and Y can also contain one or more oxirane oxygen atoms attached to vicinal carbon atoms. M or Y or both can represent alkoxyalkyl groups or groups of carbon atoms interconnected by ether linkages,

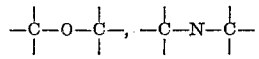

linkages, thio linkages,

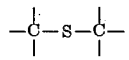

and the like. M and Y, taken together with the vicinal carbon atoms shown can represent a cyclic group such as a cyclohexane ring or a cyclopentane ring, substituted or unsubstituted with other groups, e.g., alkyl, aryl substituents and the like. The presence of other groups not otherwise specifically mentioned herein is by no means harmful and, in fact, are useful in developing special properties in coatings or films formed from those compositions containing such epoxy compounds. For example, M or Y or both both can contain one or more olefinic double bonds or acetylenic bonds. Thus, the epoxy compound employed in the compositions are selected from the class of monoepoxides and polyepoxides particularly monoepoxides, diepoxides and triepoxides or mixtures thereof. By the term "epoxy," as used herein in designating a group or compound, is meant a group composed of or a compound containing oxirane oxygen attached to vicinal carbon atoms,

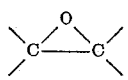

Representative of the epoxy compounds defined above are the aliphatic, cycloaliphatic, aliphatic-substituted aromatic and cycloaliphatic-substituted aromatic monoepoxides and polyepoxides, such as, butadiene dioxide, the epoxyoctanes, the epoxybutanes, the epoxyhexadecanes, the epoxyoctadecanes, gamma-glycidoxypropyltriethoxysilane, 4,5-epoxypentyltriethoxysilane, cyclohexene monoxide, vinylcyclohexene dioxide, cyclopentene monoxide, dicyclopentadiene dioxide, glycidyl propyl ether, glycidyl allyl ether, diglycidyl ether, 1,2-epoxyethylbenzene, glycidyl phenyl ether, glycidyl butyl ether, 1,2,3-tri(1,2-epoxypropoxy)propane (the triglycidyl ether of glycerine), 3,4-epoxycyclohexylmethyl 3,4-epoxycyclohexanecarboxylate, 1,6-hexanediol bis(3,4-epoxycyclohexane-carboxylate), 1,1,1,-trimethylolpropane tris(3,4-epoxycyclohexanecarboxylate) bis(3,4-epoxy-6-methylcyclohexylmethyl) maleate, bis(2,3-epoxycyclopentyl) ether, allyl 2,3-epoxycyclopentyl ether, divinylbenzene dioxide, epichlorhydrin, and the reaction products of halohydrins and polyhydric phenols, i.e., the polyglycidyl polyethers of polyhydric phenols, as for example, the diglycidyl ethers of 4,4'-dihydroxydiphenyl-2-2-propane, 4,4-dihydroxydiphenylmethane and the like and the higher polymers thereof as represented by the formula:

where A is hydrogen or alkyl, φ is phenylene, and g is a number representing the average chain length of the polymer. This formula, of course, is ideal and in practice does not in all cases truly represent all the compounds actually obtained by the reaction of epichlorhydrin and polyhydric phenols. Thus, mixtures of the diglycidyl polymers of varying molecular weight and some polymers of higher and lower glycidyl content, e.g., the triglycidyl and monoglycidyl polymers, are obtained in said reaction. The term "diglycidyl ether of a polyhydric phenol," e.g., bisphenol A, hence, includes any such mixtures obtained in practice as well as the pure diglycidyl polymer. The polyglycidyl polyethers are best characterized by their epoxy equivalency, i.e., the grams of polyglycidyl polyether which contains one gram-mole of epoxy group, and their melting points or melting point ranges (such as are determined by Durran's Mercury Method) or their viscosities. The polyhydric phenols, 4,4'-dihydroxydiphenyl-2,2-propane and 4,4'-dihydroxydiphenyl methane are hereinafter referred to as bisphenol A and bisphenol F, respectively.

Other epoxy compounds useful in preparing the resinous coatings of this invention are epoxy-silanes such as gamma-glycidoxypropyltrimethoxy-silane, 4,5-epoxypentyltriethoxysilane, beta-3,4-epoxycyclohexylethyltrimethoxysilane, and the hydrolysis products of these epoxy silanes, and epoxy compounds such as

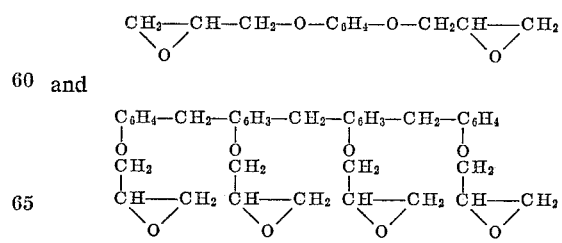

Other aminoalkyl silicon compounds useful in preparing the resinous coatings of this invention are those containing the unit

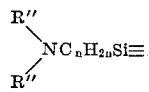

wherein $n$ is an integer from 3 to 9, $R''$ is hydrogen, hydrocarbyl or

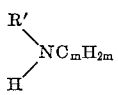

where $R'$ is hydrogen or hydrocarbyl, $m$ is an integer from 2 to 9 and the two nitrogen atoms are separated by at least 2 carbon atoms of the $C_mH_{2m}$ group. Examples of these compounds are the silanes $$H_2NCH_2CH_2NHCH_2CH_2CH_2Si(CH_3)(OCH_3)_2$$

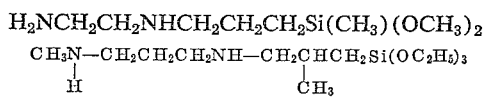

and the hydrolysis products of these amino-silanes.

A large number of epoxy compounds are commercially available. Nevertheless, they also can be made by several methods known in the art. One versatile method involves the epoxidation of organic compounds containing olefinic unsaturation employing as epoxidizing agent any one of a variety of peroxides such as peracetic acid, performic acid, perbenzoic acid, acetaldehyde monoperacetate and the like. For example, vinylcyclohexene is epoxidized by peracetic acid to vinylcyclohexene dioxide. Epoxidations of this kind are amply described in the literature and reference is made to United States Patents 2,716,123; 2,745,847; 2,750,395 and 2,785,185 and to Chemical Reviews, volume 45, Number 1, August 1949, pages 1 through 68. Epoxy compounds can be also prepared by the reaction of halohydrins, e.g., epichlorhydrin, with monohydric or polyhydric compounds, e.g., phenols and polyhydric phenols. Such reactions are carried out in accordance with methods well known in the art and generally inolves the reaction of halohydrin and hydric compounds in the presence of sufficient caustic alkali, or other strong alkali, to combine with the halogen of the halohydrin. These methods are amply described in the literaure, for example, in the United States Patents 2,506,486; 2,582,985; 2,592,560 and 2,615,007.

Volatile organic diluents which are employed in the compositions used in my process include any volatile liquid or solid organic compounds which are free of groups which substantially react with the amino-organosilicon compounds at atmospheric temperatures and pressures. These diluents include volatile solids and liquids from the hydrocarbon, chlorinated hydrocarbon, nitrogenated paraffins, hydrocarbon ether and hydrocarbon alcohol series. The diluents include the solvents for the amino-organosilicon-epoxy mixture or adduct and non-solvents therefor. When non-solvent liquid diluents are used a suitable emulsifier must be included in order to obtain a uniform diluted mixture. When a non-solvent solid diluent is employed the amino-organosilicon-epoxy mixture or adduct is simply blended with the diluent to form a solid or semi-solid dispersion of the mixture or adduct in the diluent. Solid diluents which are solvents for the amino-organosilicon-epoxy mixture or adduct form solid solutions when mixed therewith. Liquid diluents which are solvents are the easiest to use and hence are preferred. These liquid solvents when mixed with the amino-organosilicon-epoxy mixture or adduct provide liquid solutions which are simple to prepare and can be readily varied in concentration so as to allow the versatile use of the coating composition. A single diluent or mixtures of diluents can be used.

The compositions containing volatile organic diluents in addition to the amino-organosilicon and epoxy compounds are particularly advantageous in that the shelf-lives of such compositions are much greater than similar compositions containing no organic diluent. Such compositions are further advantageous from the standpoint of convenience and economy where it has been found that even extremely thin films laid down from such compositions provide superior results on ceramic and cementitious articles. These and other advantageous effects make the use of compositions containing organic diluents a preferred embodiment of my invention.

Volatile solvents for use in the compositions include the saturated and unsaturated hydrocarbons, e.g., heptane, cyclohexane, heptene, mineral spirits (i.e., volatile hydrocarbons derived low boiling petroleum fractions) toluene, xylene, tetrahydronaphthalene, decahydronaphthalene and the like; the halogenated hydrocarbons, e.g., chlorobenzene, chloroform, carbontetrachloride, trichloroethylene, dichloroethyl ether and the like; the nitrogenated paraffins, e.g., nitropropane, hydrocarbon ether, e.g., isopropyl ether, diphenyl ether, dioxane, and the like; hydrocarbon alcohols and alcohol-ethers, e.g., ethanol, butanol, ethylene glycol, diethylene glycol, and the monoalkyl ethers of ethylene, diethylene propylene and dipropylene glycol, monomethyl ether of ethylene glycol (hereinafter referred to also as methyl "Cellosolve"), mixtures thereof, and the like.

Additives can be incorporated into the compositions for modifying the properties of the compositions themselves or the coatings made therefrom. Such additives include ketones, aldehydes, esters, acids, pigments, other coloring agents, fillers, waxes (including synthetic waxes), plasticizers and resins (including silicone and organic resins). Typical additives are methyl isobutyl ketone, isophorone, heptaldehyde, amyl acetate, ethyl acetate, natural waxes such as beeswax and Carnauba wax, synthetic waxes such the highly chlorinated aromatics and aliphatics commercially available as the "Halowaxes" and "Arochlors," the high molecular weight polyoxyalkylenes and microcrystalline waxes (high molecular weight refined petroleum residues), the drying, semi-drying and non-drying oils such as linseed oil and coconut oil, the fatty acids such as oleic and linoleic acids, silicone resins such as a phenyl-methyl polysiloxane of R/So of 2 or less, synthetic organic resins such as the vinyl chloride polymers, vinyl chloride-vinyl acetate copolymers, partially hydrolyzed vinyl chloride-vinyl acetate copolymers, the acrylates, the cellulose acetate butyrates and the like. The additives can be reactive or non-reactive with my compositions. These additives, when added to the compositions in amounts of less than 85 weight percent and preferably not greater than 60 weight percent based on the weight of composition, aid in modifying or enhancing film properties or in effecting economies by adding bulk to the films, if such is desired. Illustratively, the ketones, esters and aldehydes which are lacquer-type solvents are added to enhance anti-blush and anti-craze properties, act as levelling agents and in general aid the film-forming properties of my compositions. Natural and synthetic waxes when added in small amounts enhance the mar resistance and gloss and the anti-wetting properties of films made from compositions containing them. Silicone resins enhance anti-wetting properties and hardness and promote faster drying of films laid down from compositions containing them. Many other additives for developing special properties and enhancing other properties of films are known to those skilled in the art of protective coatings and in accordance with the knowledge of those skilled in the art can be employed for similar purposes in the compositions.

The compositions employed in my process are made by forming mixtures of the amino-organosilicon compounds and the epoxy compounds. Mixtures thus formed can be applied as such to the article being coated or, particularly when an amino-organosilane is employed, such mixtures can be thermally induced to partially react thus forming an adduct of the silicon compound and epoxy compounds. This procedure of partially reacting is herein called ripening and in addition to providing the advantageous effects hereinafter set forth is also employed when gaseous epoxides are used. The partially reacted or ripened mixture then can be applied to the article being coated. The amino-organosilane-epoxy mixtures as a class have been found to possess longer shelf-lives than amino-organosiloxane-epoxy mixtures as a class. For this reason the amino-organosilane-epoxy mixtures can be advantageously pre-reacted prior to application to promote more rapid air drying once applied and to provide higher viscosities as desired. The amino-organosiloxane-epoxy mixtures on the other hand are very rapid drying and need not be pre-reacted to provide a higher viscosity.

Remarkably superior coatings are made from compositions which are made by mixing the amino-organosilicon compound, epoxy compound and the organic diluent. This can be done by adding the amino-organosilicon compound and the epoxy compound to the organic diluent or by mixing the epoxy compound with organic diluent, mixing the amino-organosilicon compound with organic diluent and then mixing the two mixtures thus formed, or by any other sequence. Mixtures thus formed are particularly advantageous in that the shelf-lives thereof are markedly improved and applied film thicknesses can be adjusted as desired. The remarkably superior coating properties of these compositions can be further improved by ripening or thermally inducing the silicon compound and epoxy compound to pre-react and partially cure. I have found that when the coating compositions are ripened the superior properties of coatings made therefrom are even further improved over unripened compositions. Thus, for best results the compositions are suitably ripened prior to application.

Ripening is believed to involve a coupling reaction of the amino group of the amino-organosilicon compound and the epoxy group of the epoxy compound. This coupling reaction occurs at a finite rate and is affected by temperature, relative concentrations of reactants, solvents or diluents, the presence of catalysts, steric factors and other variables.

Several advantageous methods are employed in ripening the compositions. In accordance with these methods the amino-organosilicon-epoxy composition is (1) stored at atmospheric temperatures; (2) stored at elevated temperatures; (3) refluxed in solvent; or (4) heated in solvent to fractionate out any by-products of condensation. Ripening is accelerated at elevated temperatures. Thus, storing, refluxing or heating at high temperatures decreases the ripening time. Ripening occurs more quickly when amino-alkylsiloxanes are employed in my composition than when aminoalkylsilanes are employed. As illustrative of the ripening process in producing the compositions, a gamma-aminopropylphenylsilicone copolymer,

[NH₂(CH₂)₃SiO₃/₂]₀.₅[C₆H₅SiO₃/₂]₀.₅

(having an aminohydrogen equivalent weight of about 120) and a diglycidyl ether of bisphenol A (having an epoxy equivalency of about 192) were mixed in such proportions as to provide two amino hydrogen equivalents of the silicone for each epoxy equivalent of the epoxide. The mixture was diluted to 7.5 percent solids by adding a solvent comprising 60 parts toluene and 40 parts methyl "Cellosolve" and allowed to ripen at room temperature for 3 to 5 days. (Alternatively, the mixture is refluxed for 4 to 16 hours.) At the end of this time the mixture was found to be suitably ripened for providing superior coatings. As a further illustration of the ripening process, 221 grams (1 mole) of gamma-aminopropyltriethoxysilane, 239 grams (1 mole) of phenyltriethoxysilane and 192 grams (1 epoxy equivalent weight) of diglycidyl ether of bisphenol A (having an epoxy equivalency of about 192) were admixed. Three portions of the mixture were ripened by the following three methods (a) stored at 70° C. for three weeks during which period the viscosity increases from that of a thin liquid to about 25,000 centipoises; (b) an equal weight of toluene was added and the solution refluxed for 6 to 24 hours; (c) an equal weight of toluene was added and the solution heated to evolve ethanol. Each of the compositions thus obtained were diluted with solvent and were found to be suitably ripened for providing superior coatings.

The relative proportions of amino-organosilicon compound and epoxy compound contained by the compositions employed in my process are not narrowly critical and can be varied over a wide range. I have employed composition of the type described herein which contain amounts of epoxy compound providing from 0.05 to 5.0 epoxy equivalents for each amino hydrogen equivalent provided by the aminoalkylsilicon compound contained by the composition. By the term "epoxy equivalents," as used herein, is meant the number of moles of epoxy groups,

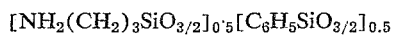

contained by a given amount of epoxy compound. Thus, one mol of monoepoxide contains one epoxy equivalent, one mole of a diepoxide contains two epoxy equivalents, and so forth. The term "epoxy equivalency," as used herein, means the number of grams of an epoxy compound which contains one gram-mole of epoxy group and is the reciprocal of the epoxy equivalents. The term "amino hydrogen equivalents," as used herein, means the number of moles of amino hydrogen atoms, H—, attached to nitrogen, contained by a given amount of amino-organosilicon compound. Thus, one mole of gamma-aminopropyltriethoxysilane contains two amino hydrogen equivalents, one mole of gamma-aminopropylphenyl cyclic tetramer contains eight amino hydrogen equivalents and so forth. Very good air drying compositions contain 0.25 to 1.0 epoxy equivalents of epoxy compound and 1.0 amino equivalent of amino-organosilicon compound. Also, compositions comprising amounts of epoxy compound containing 0.05 to 2.5 epoxy equivalents and amounts of amino-organosilicon compound containing one amino hydrogen equivalent have been found to air dry. The best compositions found, however, are those comprising amounts of epoxy and amino-organosilicon compounds which provide 0.25 to 1.5 epoxy equivalents for each amino hydrogen equivalent. The amount of hydrocarbylsilicon compound, in particular hydrocarbylsilane, when used in the compositions, also is not narrowly critical and can be varied over a wide range. Thus, a molar ratio of 1 mole of hydrocarbylsilane, e.g., phenyltriethoxysilane, or mixtures thereof, per mole of amino-organosilane, e.g., gamma-aminopropyltriethoxysilane, or mixtures thereof, provide excellent coatings and molar ratios above and below the equimolar ratio are also advantageously used.

The ripened and the finally cured products are greater in molecular weight than any of the reactants contained by the composition from which they are formed. Thus, one function of the epoxy compound is in effect, to cross-link the amino-organosilicon compounds thereby increasing the molecular weight. Indeed, it is remarkable that certain amino-organosilicones which themselves are highly cross-linked can be further cross-linked by epoxy compounds to give, quite unexpectedly, solvent soluble ripened products. Upon application, as for example, to ceramic and cementitious articles, films are formed from solutions of these ripened products as the solvent volatilizes and a final curing of the film on the article occurs giving a solvent insoluble coating.

The functionality of the epoxy compound, the degree of polymerization of the amino-organosilicon compound and the relative proportions of these compounds in the compositions have important effects on the shelf-lives of said compositions. Dilutions which contain a ripened aminoalkylsilane or -siloxane-monoepoxide mixture can be stored for long periods of time, (i.e., indefinitely) without showing any signs of gelation of precipitation for long periods of time at very high solids content, (for example, 50 to 75 percent and even higher). In fact the addition of further amounts of monoepoxide and/or diepoxides does not adversely affect the shelf-life and can even enhance aqueous resistance properties by diminishing or eliminating any water-transmitting nitrogen to hydrogen bonds which may be present. When the composition contains ripened amino-organosiloxane-diepoxide mixtures, however, lower epoxy equivalent to amino hydrogen equivalent ratios and higher dilution extend the shelf-lives of said compositions. For example, in one instance where two amino hydrogen equivalents of an aminoalkylsiloxane were ripened with one epoxy equivalent of a diepoxide and diluted to a 10 percent solids or higher compositions, the shelf-life was less than one week. When the same ripened composition was diluted to a less than 10 percent solids composition it showed no signs of gelation or precipitation for 1 to 3 months. However, if the relative proportions of diepoxide to siloxane were decreased to about 0.2 to 0.25 epoxy equivalent of diepoxide for each amino hydrogen equivalent of aminoalkylsiloxane and the ripened mixture diluted to 10 percent solids or even higher, the shelf-life was extended to long periods covering at least several months. These compositions (i.e., 0.2 to 0.25 epoxy equivalent per amino hydrogen equivalent) could even be further reacted with monoepoxides so as to react all amino hydrogens without any adverse effect on shelf-life to provide even additional water and solvent resistance to the coating made therefrom.

The teachings of this invention have also made it possible to produce on ceramic and cementitious articles coatings which are readily removable by selected methods, or, as desired, coatings which are extremely resistant to removal except by drastic methods can be made. Of course, coatings with varying degrees of removability are made by my invention. It is thus quite unexpected that all of the coatings outstandingly resist abrasion and staining and still can be made as readily removable or substantially unremovable as desired. For example, compositions comprising as the epoxy portion a higher proportion of monoepoxide than polyepoxide, or all monoepoxide, form coatings which can be readily removed but which also impart a high degree of abrasion and stain resistance and such action as by solvent, detergents and the like. On the other hand, compositions containing more polyepoxide than monoepoxide or all polyepoxide, as the epoxy portion require more drastic methods of removal but provide superior resistance to abrasion staining and solvent action.

Not wishing to be bound by any particular theory or reaction mechanism, the following explanation is believed to define the reactions taking place during ripening and/or final curing.

The fundamental reaction occurring during ripening and final curing takes place between the amino-organosilicon compound and the epoxy compound and involves the addition of the amino group to the epoxy group to form a nitrogen to carbon bond linking the amino-organosilicon compound molecule to the epoxy compound molecule and also a hydroxyl group attached to said epoxy compound molecule. Using the reaction between a gamma-aminopropylsilicon compound and styrene oxide as exemplary, the fundamental reaction is illustrated by:

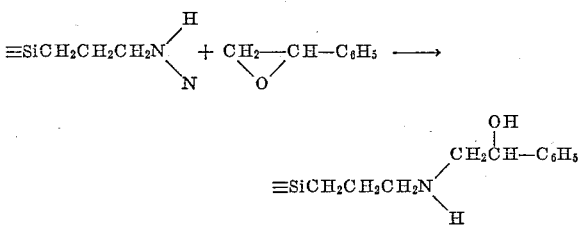

where the amounts of reactants correspond to one epoxy equivalent for each amino hydrogen equivalent. When amounts containing one epoxy equivalent for each amino hydrogen equivalent are used the reaction proceeds further, as follows:

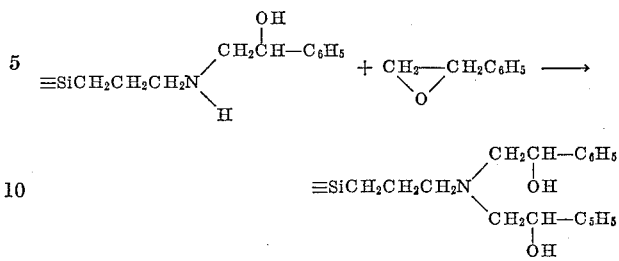

Although the foregoing equations show reactions employing stoichiometric amounts of the reactants, other than stoichiometric amounts of reactants, as hereinbefore stated, can be used to provide abrasion and stain resistant coatings. Thus, my ripened or finally cured compositions are believed to contain some unreacted amino hydrogen atoms when an amount of aminosilicon compound over and above the stoichiometric amount required to completely react with all of the epoxy groups contained by the composition is used. Similarly, unreacted epoxy groups are believed to be present in my ripened or finally cured compositions when greater than stoichiometric amounts of epoxy compound are used.

Still not wishing to be held to any theory or mechanics of reaction, I believe that an ester exchange type of reaction takes place between alkoxy groups and hydroxyl groups in a ripened composition made from an amino-organoalkoxysilane or siloxane and an epoxy compound. The alkoxy groups are, of course, attached to the silane originally introduced and the hydroxyl groups are formed by the reaction of epoxy with amino hydrogen as previously described. Using the styrene oxide-(gamma-aminopropyl)silane adduct as illustrative, this ester exchange reaction can be represented as:

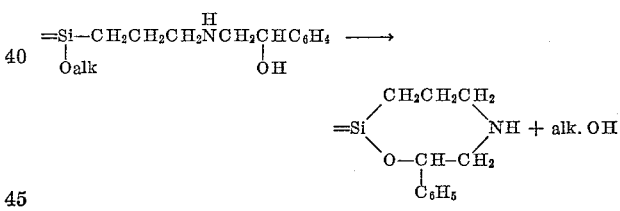

This reaction of course can also take place intermolecularly between two different molecules to form cross-linkages, as well as intramolecularly as shown. The ester exchange reactions are believed to have outward manifestations on the properties of ripened compositions. For example, the polarity of the alkoxysilane-epoxy adduct is believed to be diminished and the solubility of the ripened composition in hydrocarbon solvents improved if the ester exchange is allowed to occur. It is readily apparent that, due to the presence of the many reactive sites originally present in the composition or formed by ripening, the compositions can simultaneously and/or successively undergo other reactions to form linkages and cross-linkages in and amongst the reactive molecules contained by the compositions, during ripening or final curing.

My novel articles of manufacture are comprised of a base member having thereon a finally cured coating of a resinous material comprising the reaction product of one or more amino-organosilicon compound and one or more epoxy compound. The articles or surfaces embodying the base member which are advantageously coated with and protected by the compositions in accordance with this invention are the ceramic substances made by firing or baking earths mainly comprising clays, such as, pure and impure kaolin and kaolin mixtures with feldspars, quartz, sand, mica, iron oxides, oxides of titanium, magnesium, calcium, potassium, sodium and the like, silicates, carbonates, aluminates and the like, and cementitious substances comprising mainly a hardened, non-vitreous, inorganic cement, such as crystalline calcium hydroxide, calcium carbonate, calcium sulfate monohydrate, $(CaSO_4)_2 \cdot H_2O$, and the like, alone or as a binder for the various fillers and other materials for providing special effects employed in the art, as for example, sand, asbestos, diatomaceous earths, kieselguhr, mica, wood flour, cotton flock, paper pulp, marble chips, silicates, carbonates, aluminates and metal-oxides. The base members as above-defined include composite members comprising surfaces of ceramic or cementitious substances and substrates of different material, such as metals coated with porcelain, and members containing ceramic or cementitious substances throughout.

By the present invention, the abrasion and strain resistance of ceramic and cementitious articles is improved by applying a continuous film of the amino-organosilicon-epoxy compositions described herein on the surface of the article and curing the film to form a bonded coating on the surface of the metal article. For best results, clean, dry surfaces which are free of grease, grime, foreign deposits, stains and the like are necessary. Any suitable cleaning method can be used, a particularly effective method being to first scour with a commercial alkaline cleanser, to bleach with a commercial chlorine bleach, followed by flushing with water and drying. The method by which the amino-organosilicon-epoxy composition is applied to the article is not critical and any method can be employed that results in the deposition of a uniform, continuous film; the compositions can be applied as solvent solutions, emulsions, or dispersions in liquid or solid systems, or as undiluted amino-organosilicon-epoxy compositions. Coatings have also been made by spray application from aerosol bombs and from spray guns. In this instance, the usual chloroperfluorohydrocarbons, such as, monochloroperfluoromethane, dichloroperfluoromethane, monochlorperfluoroethane, mixtures thereof and the like, and the volatile hydrocarbon gases, such as propane, the butanes, the pentanes, butene, amylenes, mixtures thereof and the like are used as propellants for the amino-silicon-epoxy compositions. The propellant and the amino-organosilicon-epoxy composition, as a solution, emulsion or in undiluted form, are enclosed in a suitable aerosol container or bomb.

A particularly advantageous method for applying the coating is from aqueous solution where there is solubility, or from organic solvent solutions such as alcohol and ether solvent systems or solvent systems employing solvents hereinbefore described.

The compositions used for coating articles contain varying concentrations of amino-organosilicon-epoxy mixtures or adducts depending on the mode of application and desired thickness of film or coating. The amount of mixture or adduct in a particular composition or system is not critical and can be varied over wide ranges. Good results have been obtained with compositions containing up to 50 percent by weight of mixture or adduct based on the weight of composition. Compositions containing greater amounts of amino-organosilicon-epoxy mixture or adduct can be used. Of course, when compositions of undiluted mixtures or adducts are employed, the concentrations of said mixtures or adducts closely approach 100 weight percent if other additives are present and equal 100 weight percent if no other additives are present. The concentration also largely depends upon cost and convenience in addition to the shelf-life desired.

After applying the amino-organosilicon-epoxy composition to the article or surface, the coating is finally cured by simply allowing the coated article to stand at atmospheric temperatures. However, if the superior abrasion and staining resistant properties are to be developed within a short period of time, forced drying at elevated temperatures, for example, about 50° C. to 150° C. is used and this usually requires only about 10 to 20 minutes. In any event, the final curing, whether conducted at atmospheric or elevated temperatures, is thermally induced, that is to say heat (no matter whether positively applied at elevated temperatures or passively allowed to be applied at atmospheric temperatures) is believed to flow into the composition to induce curing. Any diluent present volatilizes during the final curing step. Fixing or bonding of the composition to the article coated therewith occurs during final curing. Certain coatings or compositions, if desired, can be finally cured to the insoluble stage, i.e., the stage where the solvent from which the coating was applied or could have been applied no longer dissolves the cured coating. In other instances, a coating or film which is removable at will may be desired. In these instances certain other coating compositions are used and do not cure to the insoluble stage but can be stripped from the article with particular solvents when desired.

The thickness of the film applied is not narrowly critical and can vary from very small thicknesses to relatively large ones. Film thicknesses of 0.05 mil to 0.35 mil are within the thickness range which provide optimum abrasion and staining resistance and are preferred. Film thicknesses ranging upwards from 0.15 mil are advantageous, although from an economic point of view, smaller film thicknesses can be applied without materially sacrificing the outstanding abrasion and staining resistant properties. Films of several mils also can be applied if desired. The thickness of the film is regulated by the mode of application, as by spraying, dipping, brushing, or troweling; the concentration of amino-organosilicon-epoxy mixture or adduct in the composition applied; and the number of successive applications made. Even relatively thick films can be obtained by multiple applications with very dilute compositions or extremely thin films can be obtained by a single application of such very dilute compositions. The ability of extremely thin films to provide outstanding abrasion and staining protection to ceramic and cementitious articles is an important aspect and represents a distinct advance in the art of protective coatings.

The following examples are presented. In these examples, unless otherwise specified, all percentages and parts are based on weight, the symbol $\phi$ designates the phenyl group, refluxing wherever performed was at atmospheric pressure, and all curing, testing, mixing and other steps wherein no temperatures are specified were conducted at room temperature.

EXAMPLE 1

A 9-year old domestic, porcelain enameled iron sink that had been scoured an average of twice daily was the experimental sink. I fully cleaned this sink by scouring with an alkaline abrasive cleanser. The excess residues were rinsed down the drain with clear water and the sink was thoroughly dried. To about 40 percent of the sink surface I applied by wiping a toluene solution containing 20 weight percent of the composition prepared by heating for 20 hours at 95° C. to 105° C. one mole gamma-aminopropyltriethoxysilane, one mole phenyltriethoxysilane, and one epoxy equivalent of the diglycidyl ether of bisphenol A having an epoxide equivalency of 192 as 75 percent contained material in toluene. About 0.05 to 0.10 mils coating was thus applied to the surface from a 22.5 percent contained solution. The balance of the sink was left untreated and served as control. The coating was allowed to air dry for 10 to 12 hours. At this point the surface of the treated portion of the sink was observed to have a white glossy appearance. The surface of the untreated portion of the sink was white but dull.

The sink was then used in normal household service. Food wastes, leftovers, and greasy residues were discarded into the sink several times daily. The sink was scoured an average of two times a day with a commercial alkaline abrasive cleanser (Ajax). After a period of at least fifteen weeks the treated portion remained white and glossy. The untreated portion had become heavily stained and had an unsightly appearance.

EXAMPLE 2

A porcelain sink having a very dull surface was thoroughly scoured with a commercial cleanser. The sink was rinsed with clear water and then dried. To about 33 percent of the sink surface the composition of Example 1 was spray-applied so that a thin coating was obtained. The contents of the aerosol can was:

50 volume-percent propellant ($CClF_3$)
50 volume-percent silicon-epoxy solution:
    20 weight-percent partial reaction product of—
        $H_2N(CH_2)_3Si(OEt)_3$
        $\phi Si(OEt)_3$
        Diglycidyl ether of bisphenol A (epoxy equivalency of 192)
    70 weight-percent toluene
    10 weight-percent monomethyl ether of ethylene glycol.

This sink was used on numerous occasions each day and was rigorously scoured twice a day. After this service for 1 week, ink was spilled into the sink to test for stain repellency. Where the sink had not been treated, there was severe staining and neither water rinsing nor scouring would completely remove the stain. Where the sink was treated, water readily rinsed the stain from the surface and left this portion of the sink white and clean.

EXAMPLE 3

Separate portions of an unglazed porcelain dish were treated with each of the following solutions such that two treated areas and an untreated area resulted.

Solution A

The toluene solution prepared in Example 1 was furthere diluted with a sufficient amount of a solvent mixture of 90 weight percent toluene and 10 weight percent methyl "Cellosolve" to provide a solution containing 22.5 weight percent of composition (i.e., the adduct of aminopropyltriethoxysilane, phenyltriethoxysilane and epoxy compound).

Solution B

To a 500 cc. round-bottomed flask equipped with agitator, reflux condenser and dropping funnel were charged:

89.6 grams $NH_2(CH_2)_3Si(OEt)_3$
78.0 grams $C_6H_5Si(OEt)_3$
10.8 grams $Me_2Si(OEt)_2$ While stirring this mixture add 21.2 grams $H_2O$ in a 15 minute period. Heat to reflux and maintain at reflux for two hours. This gives 196 grams of solution B–1 containing the siloxane

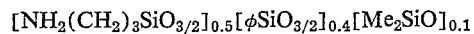
$[NH_2(CH_2)_3SiO_{3/2}]_{0.5}[\phi SiO_{3/2}]_{0.4}[Me_2SiO]_{0.1}$

To make solution B, charge the following to a clean 500 cc. round-bottomed kettle equipped with an agitator:

22.9 grams of solution B–1
4.0 grams monoethyl ether of diethylene glycol
24.3 grams monomethyl ether of ethylene glycol
24.3 grams n-butanol
24.5 grams toluene.

Stir to dissolve. Then add to this mixture a solution of 9.3 grams of the diglycidyl ether of bisphenol A (epoxy equivalency of 192) in 90.7 grams toluene. Stir for 5 minutes. Allow this system to stand for 24 hours at room temperature before using.

Application of the above solutions was made by brushing. The treated dish was then allowed to stand overnight at room temperature. The following morning grape juice was poured into the dish to fully cover it and was allowed to stand for one hour. The dish was then emptied and rinsed with water. There was no staining in the areas treated by the above solutions whereas the untreated area was severely stained.

EXAMPLE 4

The following materials of construction were partially coated by brushing with solution A of Example 3:

Mortar block
Crab Orchard sandstone
Indiana limestone
Asbestos shingle

These objects were allowed to stand overnight. It was observed that the appearance of the treated areas of these materials was not significantly changed by this application. The above materials were successively treated with grape juice and writing ink. The materials were then rinsed with water and the following observations were made:

The untreated areas of all the above-listed building materials were severely stained by both the grape juice and the ink. The treated areas of all of the listed materials had resisted staining.

EXAMPLE 5

To a one pint wide-mouth jar the following materials were charged:

88.4 grams $NH_2(CH_2)_3Si(OEt)_3$
83 grams $Si(OEt)_4$
solution of 80 grams of diglycidyl ether of bisphenol A (epoxy equivalency of 192) in 84 grams toluene.

The contents of the jar were well shaken to fully blend the ingredients. The jar was placed in a 70° C. constant temperature oven for 3 days to partially react the epoxy compound and silicon compound. At this point the viscosity had increased to 48 centipoises at 25° C. Exactly 50 grams of this reaction product and solvent were diluted with 100 grams toluene to give a solution containing 25 percent active ingredients.

EXAMPLE 6

A 3 inch x 8 inch x 1½ inch deep porcelain enamel tray had been repeatedly cleaned over the years by immersion in alcoholic potassium hydroxide. This cleaning treatment had etched away the glossy surface and left the tray dull in appearance. To demonstrate the utility of several concentrations and compositions for providing protective coatings to stain resistance, the following solutions were striped onto separate areas of the tray. An untreated area was left as control.

(a) The aminoalkylsilicon-epoxy material prepared in Example 1 (contains 20 percent active ingredients in toluene).
(b) The solution prepared in Example 1 at 22.5 percent active ingredients in toluene.
(c) The solution prepared in Example 1 at 50 percent active ingredients in toluene.
(d) The solution prepared in Example 5 at 25 percent active ingredients in toluene.

These coatings were allowed to cure by standing overnight at room temperature. Grape juice was then poured into the tray and allowed to stand for one hour. At this point the tray was cleaned by flushing with water. Where the trays had been coated with the aminoalkylsilicon-epoxy compounds there was no staining. The untreated area which served as a control was severely stained.

EXAMPLE 7

A section of terrazzo floor was thoroughly cleaned by scouring with a brush using an alkaline abrasive cleanser and water. The surface was then flushed with water and then dried with a cloth until no evidence of moisture could be detected. A portion of the cleaned surface was then treated by wiping with a solution containing 22.5 percent active ingredients in toluene of the reaction product of $H_2N(CH_2)_3Si(OEt)_3$, $\phi Si(OEt)_3$, and diglycidyl ether of bisphenol A (epoxide equivalency of 192) as prepared in Example 1. Within 5 hours the coating thus applied was hard and tack-free and had imparted a gloss to the area thus treated. This treated tile was located in a laboratory building walk-area and was inspected after use for one month. It was observed that the treated area could be readily wiped clean to a good luster and gloss. The untreated area, when rubbed vigorously, did not present a glossy appearance but remained dull and unappealing.

EXAMPLE 8

A terra cotta tile was partially coated by wiping with aminoalkylsilicon-epoxy formulas having the compositions described in Example 6, a and b. These coatings were allowed to air cure by standing overnight. An uncoated area was left as control. Grape juice was brushed on the tile and allowed to stand for one hour. At this point the tile was flushed with water. Where the tile was coated, there was no staining; where the tile was uncoated, there was severe staining. Terra cotta tile treated in the same manner was subjected to normal use as wall tile in a laboratory corridor for several months. During this period the tile received black markings from the shoe heels of individuals resting their feet on the tile. These markings were easily removed by wiping with a dry cloth. Untreated tiles carrying similar markings could not be removed by wiping with a cloth but had to be vigorously scrubbed in order to remove said markings.

EXAMPLE 9

To a 1-liter, 3-necked round-bottomed flask fitted with reflux condenser, agitator, thermometer, and dropping funnel, the following were charged: 176.2 grams of delta-aminobutyltriethoxysilane, 180 grams of phenyltriethoxysilane, and 133.5 grams of methyltriethoxysilane. The kettle contents were agitated and in a period of 3 minutes exactly 40.5 grams of water were added. The kettle contents were heated to reflux and maintained at 84.5° C. for 4½ hours. The product, 529 grams, was a water-white polymer solution.

Preparation of epoxy adducts with the above-described aminobutylsilicon-polymer were made by mixing portions of the aminobutylsilicon compound with an epoxy compound and solvent and allowing the mixtures to ripen at 70° C. in a covered glass container. The following table describes the amounts of ingredients and the ripening conditions:

| Solution No. | Grams aminobutyl silicon compound | Grams epoxy compound | Grams solvent [1] mixture | Hours storage at 70° C. |
|---|---|---|---|---|
| 1 | 21.7 | [2] 32.1 | 296.2 | 24 |
| 2 | 12.0 | [2] 34.1 | 253.9 | 96 |
| 3 | 69.0 | [3] 37.5 | 372.0 | 24 |
| 4 | 30.1 | [3] 32.7 | 237.0 | 96 |

[1] The solvent is a mixture that consists of 70 parts toluene, 15 parts n-butanol, 15 parts monomethylether of ethylene glycol and 5 parts monoethylether of diethylene glycol.
[2] Diepoxy compound as 50 percent solids in toluene solution. The epoxy solids is a commercially available epoxy resin based on the diglycidyl ether of bis-phenol A and has an epoxy equivalent of 500.
[3] Diepoxy compound as 50 percent solids in toluene solution. The epoxy solids is a commercially available diglycidyl ether of bis-phenol A and has an epoxy equivalent of 192.

EXAMPLE 10

The experimental object was a white procelain enamel tray, the surface of which was thoroughly etched and flat in gloss through years of use and repeated cleaning with strong alkaline washing solutions. The above-described amino-butylsilicon-epoxy compounds were brushed onto the tray and allowed to air dry for 16 hours. At this point it was very apparent that the coatings had provided a high gloss to the porcleain surface. The coatings were completely tack-free and were hard and resistant to scratching.

Grape juice was poured onto the procelain surface and allowed to stand for 1 hour at which point it was rinsed with running water. In the non-coated area which served as a control, there were red stains. Where all four coatings had been applied to the porcelain surface, there was no staining, thus showing that the above aminobutylsilicon-epoxy compositions restore gloss to dull, porcelain surfaces and provide stain-resistant coatings thereon.

What is claimed is:

1. A coated article comprising a base member having as the surface thereof a substance selected from the class consisting of ceramic substances and cementitious substances and a coating thereon of a resinous material comprising the reaction product of the mixture comprising a diglycidyl ether of bisphenol A free of hydroxyl groups, gamma-aminopropyltriethoxysilane and phenyltriethoxysilane.

2. A coated article in accordance with claim 1 wherein said base member has a porcelain surface.

3. A coated article in accordance with claim 1 wherein said base member has a terrazzo surface.

4. A coated article in accordance with claim 1 wherein said base member has a sandstone surface.

5. A coated article in accordance with claim 1 wherein said base member has a limestone surface.

6. A coated article comprising a base member having as the surface thereof a substance selected from the class of ceramic substances and cementitious substances and coating thereon of a resinous material comprising the reaction product of the mixture comprising a diglycidyl ether of bisphenol A free of hydroxyl, and the siloxane polymer of the formula:

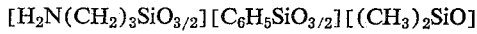

7. A coated article comprising an asbestos shingle and a coating thereon of a resinous material comprising the reaction product of the mixture comprising a diglycidyl ether of bisphenol A free of hydroxyl groups, gamma-aminopropyltriethoxysilane and phenyltriethoxysilane.

8. A coated article comprising a base member having as the surface thereof a substance selected from the class consisting of ceramic substances and cementitious substances and a coating thereon of a resinous material comprising the reaction product of (A) an epoxy compound free of hydroxyl groups, each epoxy group comprising an oxirane oxygen attached to vicinal carbon atoms and (B) an amino-organosilicon compound represented by the formula:

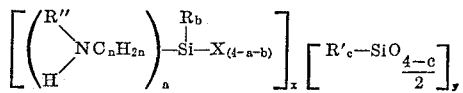

wherein:

(1) $R'$ is a group selected from the class consisting of hydrogen and hydrocarbyl;
(2) $R''$ is a group selected from the class consisting of hydrogen, hydrocarbyl and

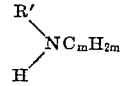

(3) $R$ is a group selected from the class consisting of hydrocarbyl, halogenated hydrocarbyl, hydroxy and hydrocarbyloxy;
(4) $X$ is a group selected from the class consisting of hydroxy, hydrocarbyloxy and $O_{1/2}$;
(5) $n$ is an integer from 3 to 9;
(6) $m$ is an integer from 2 to 9;
(7) $a$ is an integer from 1 to 3;
(8) $b$ is an integer from 0 to 2;
(9) $c$ is an integer from 0 to 3;
(10) $a+b$ is an integer from 1 to 3;
(11) $x$ is an integer equal to one when $X$ is selected from the class consisting of hydroxy and hydrocarbyloxy and $x$ is a mole fraction greater than 0, but not greater than 1, when $X$ is $O_{1/2}$;
(12) $y$ is equal to zero when $X$ is selected from the class consisting of hydroxy and hydrocarbyloxy and $y$ is a mole fraction from 0 to less than 1 when X is $O_{1/2}$;

(13) $x+y$ is equal to 1; and

(14) the amino group, —NHR″ is attached to a carbon atom which is at least two carbon atoms removed from silicon and nitrogen atoms are separated by at least two carbon atoms of the $C_mH_{2m}$ group, said reaction product containing adducts resulting from the reaction of the epoxy groups of said epoxy compound with amino groups of said amino-organosilicon compounds.

9. A coated article as claimed in claim 8 wherein the epoxy compound is a diepoxide.

10. A coated article comprising a base member having as the surface thereof a substance selected from the class consisting of ceramic substances and cementitious substances and a coating thereon of a resinous material comprising the reaction product of (a) a diepoxide free of hydroxyl groups, each epoxy group comprising an oxirane oxygen attached to vicinal carbon atoms and (b) an amino-organosilane represented by the formula:

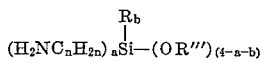

wherein R‴ is selected from the class consisting of hydrogen and hydrocarbyl groups, R is a hydrocarbyl group, $n$ is an integer from 3 to 9, $a$ is an integer from 1 to 3, $b$ is an integer from 0 to 2, the sum of $a+b$ is not greater than 3, and —NH₂ is attached to carbon which is at least two carbons removed from silicon, said reaction product containing adducts resulting from the reaction of the epoxy groups of said diepoxide with the amino groups of said amino-organosilane.

11. A coated article comprising a base member having as the surface thereof a substance selected from the class consisting of ceramic substances and cementitious substances and a coating thereon of a resinous material comprising the reaction product of (A) a diepoxide free of hydroxyl groups, each epoxy group comprising an oxirane oxygen attached to vicinal carbon atoms, (B) an amino-organosilane represented by the formula:

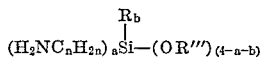

wherein R‴ is selected from the class consisting of hydrogen and hydrocarbyl groups, R is a hydrocarbyl group, $n$ is an integer from 3 to 9, $a$ is an integer from 1 to 3, $b$ is an integer from 0 to 2, the sum of $a+b$ is not greater than 3, and —NH₂ is attached to carbon which is at least two carbons removed from silicon, and (C) an organosilicon compound represented by the formula:

wherein R′ is selected from the class consisting of hydrogen and hydrocarbyl groups, X is a group selected from the class consisting of hydroxy, hydrocarbyloxy and $O_{1/2}$, and $c$ is an integer from 0 to 3, said reaction product containing adducts resulting from the reaction of the epoxy groups of said diepoxide with the amino groups of said amino-organosilane.

12. A coated article comprising a base member having as the surface thereof a substance selected from the class consisting of ceramic substances and cementitious substances and a coating thereon of a resinous material comprising the reaction product of (A) a diepoxide free of hydroxyl groups, each epoxy group comprising an oxirane oxygen attached to vicinal carbon atoms, and (B) an amino-organosiloxane selected from the group consisting of homopolymers and copolymers represented by the formulas:

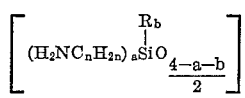

and

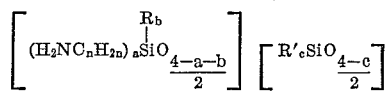

wherein:

(1) R is a group selected from the class consisting of hydrocarbyl, halogenated hydrocarbyl, hydroxy and hydrocarbyloxy;
(2) R′ is selected from the class consisting of hydrogen and hydrocarbyl groups;
(3) $n$ is an integer from 3 to 9;
(4) $a$ is an integer from 1 to 3;
(5) $b$ is an integer from 0 to 2;
(6) $c$ is an integer from 0 to 3;
(7) $a+b$ is an integer from 1 to 3; and
(8) the amino group, —NH₂, is attached to a carbon atom which is at least two carbon atoms removed from silicon, said reaction product containing adducts resulting from the reaction of the epoxy groups of said diepoxide with the amino groups of said amino-organosiloxane.

13. A coated article in accordance with claim 12 wherein said coating comprises the reaction product of (A) a diepoxide as defined in claim 12, (B) an amino-organosiloxane as defined in claim 12 and (C) an organosilicon compound represented by the formula:

wherein R′ is selected from the class consisting of hydrogen and hydrocarbyl groups, X is a group selected from the class consisting of hydroxy, hydrocarbyloxy and $O_{1/2}$, and $c$ is an integer from 0 to 3, said reaction product containing adducts resulting from the reaction of the epoxy groups of said diepoxide with the amino groups of said amino-organosiloxane.

14. A process for rendering an article having as the surface thereof a substance selected from the class consisting of ceramic substances and cementitious substances stain and abrasion resistant, said process comprising applying to said article a coating comprising a mixture of (A) an epoxy compound free of hydroxyl groups, each epoxy group comprising an oxirane oxygen attached to vicinal carbon atoms and (B) an amino-organosilicon compound represented by the formula:

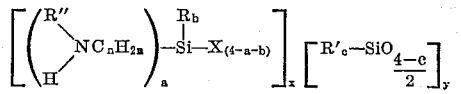

wherein:

(1) R′ is a group selected from the class consisting of hydrogen and hydrocarbyl;
(2) R″ is a group selected from the class consisting of hydrogen, hydrocarbyl and

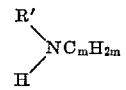

(3) R is a group selected from the class consisting of hydrocarbyl, halogenated hydrocarbyl, hydroxy and hydrocarbyloxy;
(4) X is a group selected from the class consisting of hydroxy, hydrocarbyloxy, and $O_{1/2}$;
(5) $n$ is an integer from 3 to 9;
(6) $m$ is an integer from 2 to 9;
(7) $a$ is an integer from 1 to 3;
(8) $b$ is an integer from 0 to 2;
(9) $c$ is an integer from 0 to 3;
(10) $a+b$ is an integer from 1 to 3;
(11) $x$ is an integer equal to one when X is selected from the class consisting of hydroxy and hydrocarbyloxy and $x$ is a mole fraction greater than 0, but not greater than 1, when X is $O_{1/2}$;

(12) $y$ is equal to zero when X is selected from the class consisting of hydroxy and hydrocarbyloxy and $y$ is a mole fraction from 0 to less than 1 when X is $O_{1/2}$;

(13) $x+y$ is equal to 1; and

(14) The amino group, —NHR″, is attached to carbon atom which is at least two carbon atoms removed from silicon and nitrogen atoms are separated by at least two carbon atoms of the $C_mH_{2m}$ group, and curing said coating by thermally inducing the reaction of the epoxy groups of said epoxy compound with the amino groups of said amino-organosilicon compound.

15. Process in accordance with claim 14 wherein said mixture of epoxy compound and amino-organosilicon compound is partially cured prior to applying to said article by heating said mixture.

16. A process for rendering an article having as the surface thereof a substance selected from the class consisting of ceramic substances and cementitious substances stain and abrasion resistant, said process comprising applying to said article a coating comprising a mixture of (A) a diepoxide free of hydroxyl groups, each epoxy group comprising an oxirane oxygen attached to vicinal carbon atoms, (B) an amino-organosilane represented by the formula:

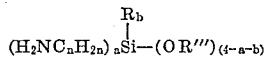

wherein R‴ is selected from the class consisting of hydrogen and hydrocarbyl groups, R is a hydrocarbyl group, $n$ is an integer from 3 to 9, $a$ is an integer from 1 to 3, $b$ is an integer from 0 to 2, the sum of $a+b$ is not greater than 3, and —NH$_2$ is attached to carbon which is at least two carbons removed from silicon, and (C) an organosilicon compound represented by the formula:

$$[R'_cSiX_{4-c}]$$

wherein R′ is selected from the class consisting of hydrogen and hydrocarbyl groups, X is a group selected from the class consisting of hydroxy, hydrocarbyloxy and $O_{1/2}$, and $c$ is an integer from 0 to 3, and curing said coating by thermally inducing the reaction of the epoxy groups of said diepoxide with the amino groups of said amino-organosilane.

17. A process for rendering an article having as the surface thereof a substance selected from the class consisting of ceramic substances and cementitious substances stain and abrasion resistant, said process comprising applying to said article a coating comprising a mixture of (A) a diepoxide free of hydroxyl groups, each epoxy group comprising an oxirane oxygen attached to vicinal carbon atoms and (B) an amino-organosiloxane selected from the group consisting of homopolymers and copolymers represented by the formulas:

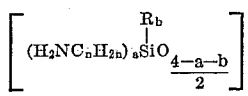

and

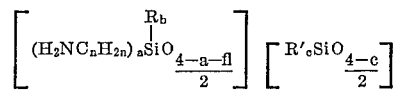

wherein:
(1) R is a group selected from the class consisting of hydrocarbyl, halogenated hydrocarbyl, hydroxy and hydrocarbyloxy;
(2) R′ is selected from the class consisting of hydrogen and hydrocarbyl groups;
(3) $n$ is an integer from 3 to 9;
(4) $a$ is an integer from 1 to 3;
(5) $b$ is an integer from 0 to 2;
(6) $c$ is an integer from 0 to 3;
(7) $a+b$ is an integer from 1 to 3; and
(8) the amino group, —NH$_2$, is attached to a carbon atom which is at least two carbon atoms removed from silicon, and curing said coating by thermally inducing the reaction of the epoxy groups of said diepoxide with the amino groups of said amino-organosiloxane.

18. A process for rendering an article having as the surface thereof a substance selected from the class consisting of ceramic substances and cementitious substances stain and abrasion resistant, said process comprising applying to said article a coating comprising a mixture of a diglycidyl ether of bisphenol A free of hydroxyl groups, gamma-aminopropyltriethoxysilane and phenyltriethoxysilane and curing said coating by heating at a temperature between about room temperature and about 150° C. to cause reaction of the epoxy groups of said diglycidyl ether of bisphenol A and the amino group of said gamma-aminopropyltriethoxysilane.

19. The process in accordance with claim 18 wherein said article has a porcelain surface.

20. A process for rendering an article having as the surface thereof a substance selected from the class consisting of ceramic substances and cementitious substances stain and abrasion resistant, said process comprising applying to said article a coating comprising a mixture of a diglycidyl ether of bisphenol A free of hydroxyl groups and a siloxane polymer of the formula:

$$[H_2N(CH_2)_3SiO_{3/2}][C_6H_5SiO_{3/2}][(CH_3)_2SiO]$$

and curing said coating by heating at a temperature between about room temperature and about 150° C. to cause reaction of the epoxy groups of said diglycidyl ether of bisphenol A and the amino groups of said siloxane polymers.

References Cited by the Examiner
UNITED STATES PATENTS 2,819,245   1/1958   Shorr _____ 260—42

FOREIGN PATENTS 202,627   11/1955   Australia.

RICHARD D. NEVIUS, *Primary Examiner.*